(No Model.)

J. F. RENN.
EGG BEATER.

No. 515,249. Patented Feb. 20, 1894.

Witnesses:
Albert B. Blackwood
Carleton E. Snell

Inventor:
John Franklin Renn
by J. H. Soulé & Co.
Attorneys.

THE NATIONAL LITHOGRAPHING COMPANY,
WASHINGTON, D. C.

UNITED STATES PATENT OFFICE.

JOHN FRANKLIN RENN, OF TREVORTON, PENNSYLVANIA, ASSIGNOR OF ONE-HALF TO HENRY JACKSON RENN, OF SAME PLACE.

EGG-BEATER.

SPECIFICATION forming part of Letters Patent No. 515,249, dated February 20, 1894.

Application filed May 26, 1893. Serial No. 475,603. (No model.)

*To all whom it may concern:*

Be it known that I, JOHN FRANKLIN RENN, a citizen of the United States, residing at Trevorton, in the county of Northumberland and State of Pennsylvania, have invented certain new and useful Improvements in Egg-Beaters and Similar Utensils for Mixing Liquid or Semi-Liquid Substances; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates especially to egg-beaters such as are introduced into a cup, bowl, dish, or other receptacle containing the eggs to be beaten and operated therein to agitate the mass and reduce the same to the desired consistency, the particular style of egg-beaters to which this invention relates being those in which the agitation or beating is effected by the action of a piston reciprocated within a cylindrical tube, whereby air is forced into and through the egg-substance.

The invention consists in certain improvements in pneumatic egg-beaters of this class, as will appear from the detailed description and claims below presented.

The improved egg-beater is also adapted to be be used for stirring and mixing drinks and other liquid or semi-liquid substances where its use may be found desirable.

The drawings illustrate an egg-beater made in accordance with the invention.

Figure 1:
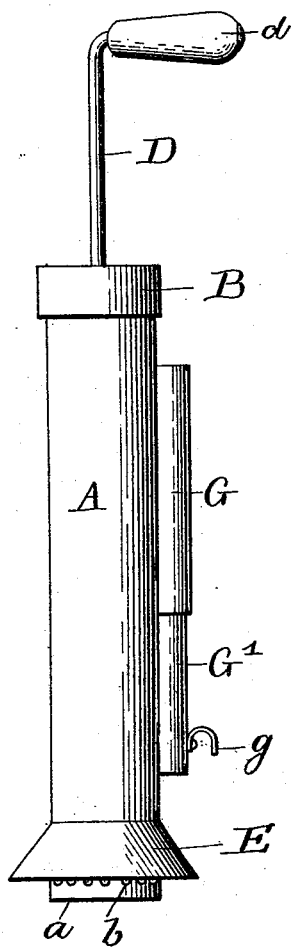
Figure 2:
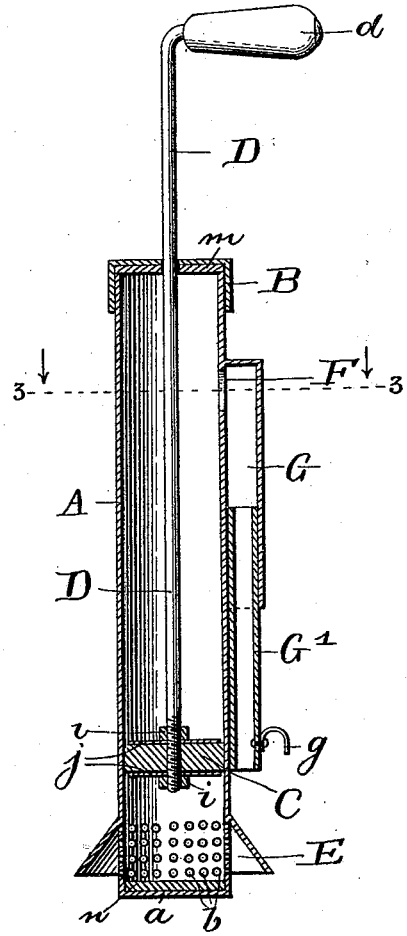
Figure 3:
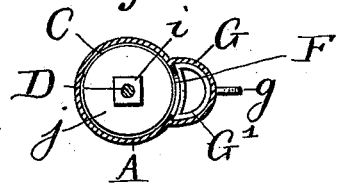

Figure 1, is a side view. Fig. 2, is a central longitudinal section, and Fig. 3, is a horizontal section in the plane indicated by the line 3—3 in Fig. 2.

A, is a cylindrical or tubular metallic casing constituting the main body of the egg-beater, and having a closed bottom $a$, and a removable cap B closing its upper end. Near the closed bottom $a$ the cylinder is provided with a series of apertures or perforations $b\,b$. Within the cylinder is a piston C, carried by a piston-rod D which extends upwardly through and beyond the cap B of the casing and is provided at its upper end with a manipulating knob or handle $d$. In use, the lower end of the cylinder A, is introduced into the eggs or mixture to be beaten or stirred, with the closed bottom $a$ resting upon the bottom of the dish or other receptacle, and the piston is reciprocated within the cylinder by manipulating the handle $d$, thereby sucking and driving the substance back and forth through the apertures $b$, forcing air through the mass, and thoroughly agitating and mixing the same. The egg or other substance is more thoroughly beaten by being forced through the perforations $b$ than it would be if the cylinder had simply an open bottom and imperforate sides. Moreover the location of the apertures only at the sides of the cylinder enables the implement to rest upon the bottom of the receptacle containing the material without obstructing at all the outlet.

Surrounding the cylinder A at its lower end is a downward-flaring ring or cup E, which is soldered or otherwise secured air-tight to the cylinder just above the upper circle of perforations $b$ and extends downward and outward encircling the perforated end of the cylinder and constituting a shield or guard. The special function of the cup E is to form a suction chamber, so that proper suction may be had through the apertures $b$ even when there is but a small quantity of material to be worked. Though there be but sufficient material to just cover the mouth of the cup E, the full effect of all the perforations $b$ will be preserved owing to the suction created within the cup E at the upward stroke of the piston. If the cup E were omitted, the proper suction could not be attained unless the quantity of material were sufficient to cover all of the perforations $b$, but the suction-cup has the effect of continuing all the apertures or perforations $b$ down to a common outlet which is but slightly above the plane of the bottom of the cylinder or casing A. If there is a considerable depth of material to be worked, the cup E, insures the perfect agitation of the mass from the bottom of the receptacle.

Near its upper end the cylinder A is provided with an aperture F for relieving the air pressure behind (above) the piston C.

Secured to the side of the cylinder and leading downward from the aperture F, is an air-tube G G' whereby the air forced out through aperture F at the upward stroke of the piston is conducted down and directed against the surface of the material which is being worked, thus assisting in the agitation and aeration of the material. The lower open end of the air tube should be just above the surface of the material, and in order to adapt the length of the tube to varying quantities of material it is made in two sections, the upper section G being rigidly secured to the cylinder or casing A, and the lower section G' being adapted to slide longitudinally within or upon the section G to vary the length of the tube as desired. For convenience in adjusting the tube, the section G' may be provided with a handle $g$.

The construction of the egg-beater should be such that the spaces within cylinder A, cup E, and air-tube G G' will be air-tight, except for the perforations $b$ at the lower end of the cylinder and the outlet from tube G'. To secure this, the cup E and air-tube G are preferably soldered to the casing A, and the movable section G' of the air-tube fits closely within the upper stationary section G.

The piston C, is or may be of cork fitting tightly within the cylinder and attached to the piston-rod D by two screw-nuts $i\ i$ above and below piston C which engage with screw threads upon the end of the piston-rod. If the piston is of cork or similar elastic material, a thin metallic plate or disk $j$ of substantially or nearly the diameter of the piston is preferably inserted between the cork and each of the attaching nuts $i$, the disks $j\ j$ forming a metallic casing for the piston whereby it is protected and strengthened. A washer $m$ of leather or other suitable material is placed within the cap B of the cylinder surrounding the piston-rod and serving as a packing therefor. A similar disk or washer $n$ may be placed upon the bottom $a$ of cylinder A to serve as a cushion for the lower end of the piston rod.

I claim as my invention—

1. An egg-beater or liquid-mixer adapted to be introduced into a vessel containing the material to be beaten or mixed, comprising a tubular casing with peripheral perforations near its lower end, a piston working within said casing, and a suction chamber at the lower end of said tubular casing surrounding said peripheral perforations and terminating in an open mouth below the same, substantially as set forth.

2. An egg-beater or liquid-mixer adapted to be introduced into a vessel containing the material to be beaten or mixed, comprising a tubular casing having a closed bottom and provided with perforations on its periphery near its lower end, and a piston working within said casing, in combination with a suction-cup E embracing said cylinder above said perforations and extending downward and outward, substantially as set forth.

3. An egg-beater or liquid-mixer adapted to be introduced into a vessel containing the material to be beaten or mixed, comprising a tubular casing having a closed bottom and peripheral perforations above said closed bottom, and a piston working within said casing, in combination with a suction chamber surrounding said perforations, the open mouth of said suction chamber being below said perforations but above the plane of the closed bottom of the casing, substantially as set forth.

4. An egg-beater comprising a tubular casing, and a piston working in said casing, said cylinder having apertures $b$, F at its lower and upper ends respectively for the escape of air, in combination with an air-tube communicating with the aperture at the upper end of the casing and extending downward therefrom, substantially as set forth.

5. An egg-beater comprising a tubular casing, and a piston working in said casing, said cylinder having apertures $b$, F at its lower and upper ends respectively for the escape of air, in combination with a longitudinally-adjustable air-tube communicating with the aperture at the upper end of the casing and extending downward therefrom, substantially as set forth.

In testimony whereof I affix my signature in presence of two witnesses.

JOHN FRANKLIN RENN.

Witnesses:
P. S. BERGSTRESSER,
J. H. WARD.